United States Patent [19]
Dimond et al.

[11] Patent Number: 4,779,152
[45] Date of Patent: Oct. 18, 1988

[54] TAPE CARTRIDGE RECORD/PLACKBACK APPARATUS

[75] Inventors: Steven A. Dimond; Manuel A. Escuder; Benjamin C. N. Wilkinson, all of Bristol, United Kingdom

[73] Assignee: Hewlett-Packard Company, Palo Alto, Calif.

[21] Appl. No.: 878,846

[22] PCT Filed: Oct. 8, 1985

[86] PCT No.: PCT/GB85/00452
§ 371 Date: Jul. 7, 1986
§ 102(e) Date: Jul. 7, 1986

[87] PCT Pub. No.: WO86/02192
PCT Pub. Date: Apr. 10, 1986

[30] Foreign Application Priority Data
Oct. 8, 1984 [GB] United Kingdom ............... 8425407

[51] Int. Cl.⁴ .................................. G11B 15/68
[52] U.S. Cl. .................................. 360/92
[58] Field of Search ............ 360/92, 91, 137; 242/181

[56] References Cited
U.S. PATENT DOCUMENTS

| | | | |
|---|---|---|---|
| 2,941,739 | 6/1960 | Burke | 360/95 X |
| 3,938,190 | 2/1976 | Semmlow et al. | 360/72 |
| 3,956,768 | 5/1976 | Covington | 360/92 |
| 4,133,013 | 1/1979 | Fischer | 360/92 |
| 4,145,724 | 3/1979 | Medding et al. | 360/92 |
| 4,164,765 | 8/1976 | Gysling | 360/92 |
| 4,635,150 | 1/1987 | Kato et al. | 360/92 X |

FOREIGN PATENT DOCUMENTS

| | | |
|---|---|---|
| 0145268 | 6/1985 | European Pat. Off. |
| 2296903 | 7/1976 | France. |
| 2452761 | 10/1980 | France. |

*Primary Examiner*—John H. Wolff
*Attorney, Agent, or Firm*—S. A. Kassatly; Bloor Redding, Jr.

[57] ABSTRACT

A cartridge-handling arrangement for selectively transferring a tape cartridge from a fixed store holding a plurality of cartridges in a vertical stack, to a fixed record/playback station. The cartridge-handling arrangement comprises an elevator platform moving between the appropriate store level and the level of the record/playback station and a displacement mechanism for transferring a selected cartridge between the store and the elevator platform and between the elevator platform and the record/playback station. The overall arrangement is such that a selected cartridge is presented to the record/playback station in a horizontal attitude.

60 Claims, 10 Drawing Sheets

TAPE CARTRIDGE RECORD/PLACKBACK APPARATUS

This invention relates to tape cartridge record/playback apparatus of the type in which a desired cartridge can be selectively removed from a multi-cartridge store and presented to a record/playback station.

BACKGROUND OF THE INVENTION

A number of previous proposals have been made which provide systems for transporting magnetic tape cartridges and cassettes (hereinafter generally referred to as cartridges unless otherwise specified) between tape recording and playback units and a store of cartridges where a plurality of these cartridges is maintained. Some of these previous proposals provide for sequentially delivering cartridges to a recording and playback unit in a fixed order. Others provide for preselecting the sequence in which the cartridges are delivered to the recording and playback unit.

In order to achieve sequential delivery, whether in a fixed or selectable order, it has been previously proposed to provide for movement of the record and playback unit relative to the store of cartridges so that any selected cartridge can be conveyed in a single plane between its storage location and the record and playback unit. Such a proposal has been embodied in an audio cassette record and playback unit which is manufactured by Sony as their MTL10 product. This unit provides storage for ten audio-type cassettes maintained in parallel vertical planes and transportable each to a location, in any preselected sequence, whereat the cassette is entrained by an automatically movable holder and movable in its own plane to the record and playback unit.

Such a system is eminently suited to audio cassette record and playback units in which the reels are of light weight and are arranged to be driven by rotatable spindles. However, magnetic tape cartridges of the type which are intended for use in storage of digital information in the computer industry require to be used and driven whilst maintained in horizontal attitude due to the requirement for very precise alignment of the tape in handling rapid transfer of high density data to and from the tape.

One form of tape cartridge for use in data processing equipment is disclosed in U.S. Pat. No. 3,692,255, and a commercial form of this type of cartridge is available from Hewlett-Packard Company as its 9164-0127 600-feet magnetic tape cartridge. A characteristic feature of this cartridge is that drive is imparted to the tape reels by an endless belt frictionally engaging a drive wheel having a part of its periphery arranged to frictionally engage a drive roller of a cartridge drive unit, when the cartridge is properly mounted in the unit.

One type of cartridge record and playback unit designed for use with the aforesaid cartridge is the Hewlett-Packard Model 9144 manufactured by Hewlett-Packard Company. A similar unit is incorporated in Hewlett-Packard's Model 7900 Series tape and disc drive. With this type of tape/disc drive, when it is desired to transfer, or "dump" more data from a disc than can be stored on a single cartridge an operator has to be in constant attendance when it is desired to 'dump' data from a disc onto tape storage, because it is necessary with the different storage capacities of the disc and the tape, to change tape cartridges regularly, at intervals as short as approximately every thirty minutes. It is, therefore, desirable to provide means whereby a plurality of cartridges can be transported one at a time and in any desired sequence to the record and playback unit from a store so that data can be transferred between a disc and the plurality of tapes.

The aforementioned prior art proposals are unsuitable for this purpose, either because they require the cartridges to be mounted vertically or they require either the record and playback unit or the store to be bodily movable. The net effect of the latter problem is to require very considerable re-design of existing equipment, to accommodate, inter alia, space for movement of the record and playback unit or the store.

SUMMARY OF THE INVENTION

According to one aspect of the present invention, there is provided tape cartridge record/playback apparatus characterised by a fixed record/playback station, a fixed store for housing a plurality of tape cartridges one above another in a vertical stacking, and cartridge-handling means for selecting a cartridge from an allocated position in the store and conveying it to the record/playback station such that the cartridge is horizontal at said station, the cartridge handling means being further arranged to return a cartridge to its allocated position in the store from the record/playback station.

Preferably, the cartridge-handling means comprises elevator means including a cartridge carrier movable between the level of a selected cartridge of the store and the level of the record/playback station, and displacement means mounted on the cartridge carrier for engaging a selected cartridge to move the cartridge between the store and the cartridge carrier and between the cartridge carrier and the record/playback position. Advantageously, the said displacement means comprises a single common mechanism for effecting both the transfer of a cartridge between the store and the carrier and the transfer of the cartridge between the carrier and the record/playback station.

In a preferred embodiment, the store is such that cartridges held therein are spaced vertically from each other, said displacement means including a movable member having a projecting portion and cartridge-entraining means disposed on the projecting portion, and said projecting portion of the movable member being arranged to enter the store in the space between a selected cartridge and an immediately adjacent cartridge to an extent permitting said entrainment means to engage a rear edge of the cartridge whereby to entrain the cartridge for movement from the store to the cartridge carrier and subsequently from the cartridge carrier to the record/playback station. The entrainment means may, for example, comprise an elongate member having a part providing an abutment arranged to engage a rear edge of the cartridge when the elongate member is rotated, and means for rotating the member.

According to another aspect of the present invention, there is provided tape-cartridge record/playback apparatus including a store for housing a plurality of tape cartridges in spaced relation, and cartridge removal means for removing a selected cartridge from the store, characterised in that said cartridge removal means comprises a movable member having a projecting portion and cartridge-entraining means disposed on the projecting portion, the form of the projecting portion and entraining means being such as to enable them to enter the store in the space between a selected cartridge and an immediately adjacent cartridge, and drive means arranged to displace the projecting portion of the movable member into the store to an extent permitting said entrainment means to engage the rear edge of a selected cartridge whereby to entrain the cartridge for movement from the store.

BRIEF DESCRIPTION OF THE DRAWINGS

There now follows a detailed description which is to be read with reference to the accompanying drawings of apparatus according to the invention; it is to be clearly understood that this apparatus has been selected for description to illustrate the invention by way of example and not by way of limitation.

In the accompanying drawings.

DESCRIPTION OF THE PREFERRED EMBODIMENTS

Figure 1:
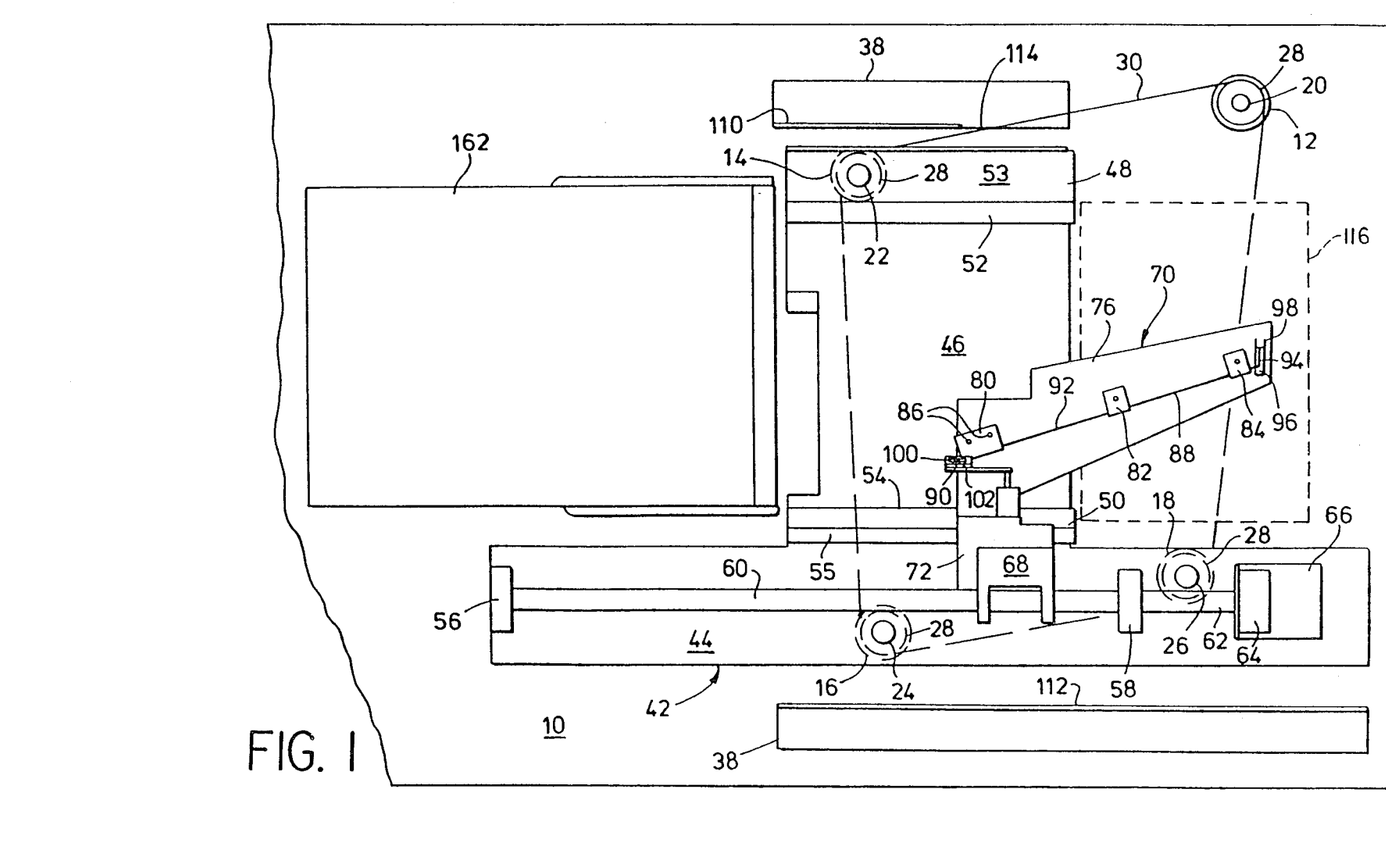
FIG. 1 is a plan view of apparatus embodying the present invention.
Figure 2:
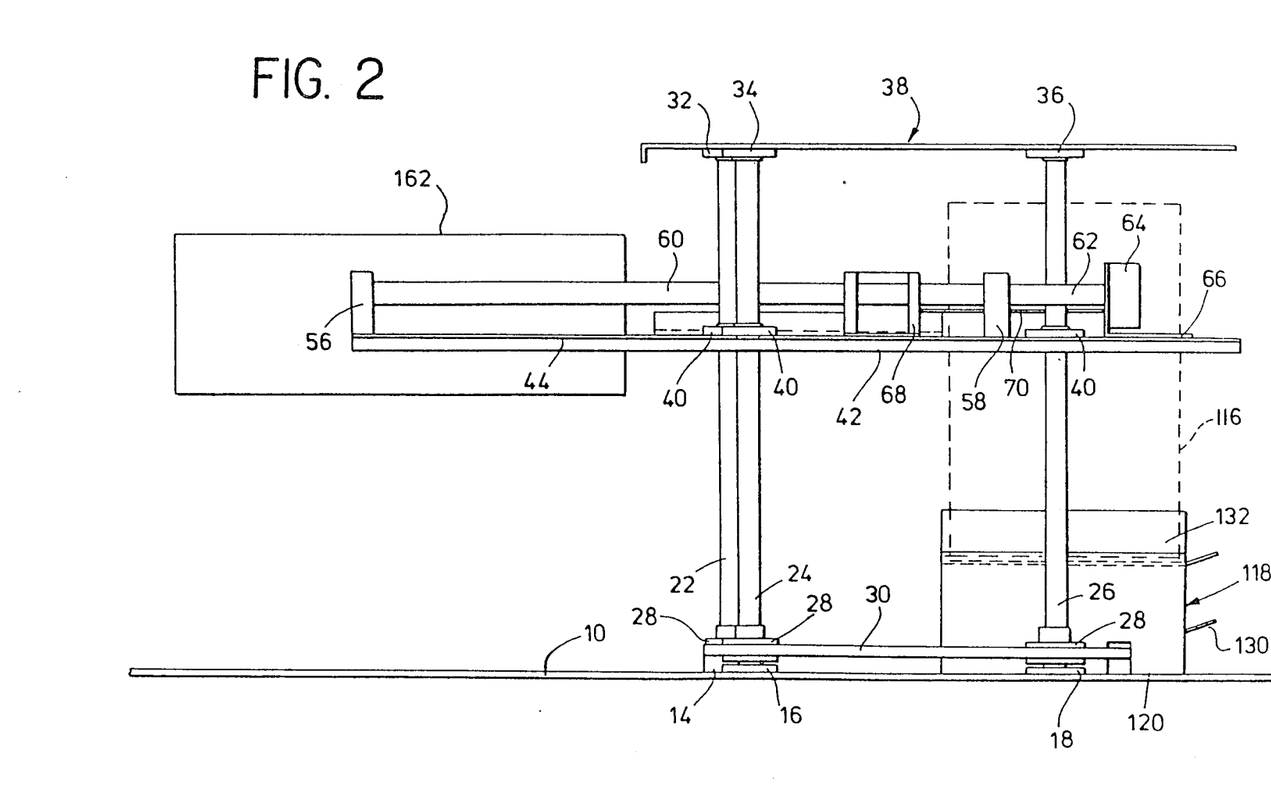
FIG. 2 is a side elevation of the FIG. 1 apparatus.
Figure 3:
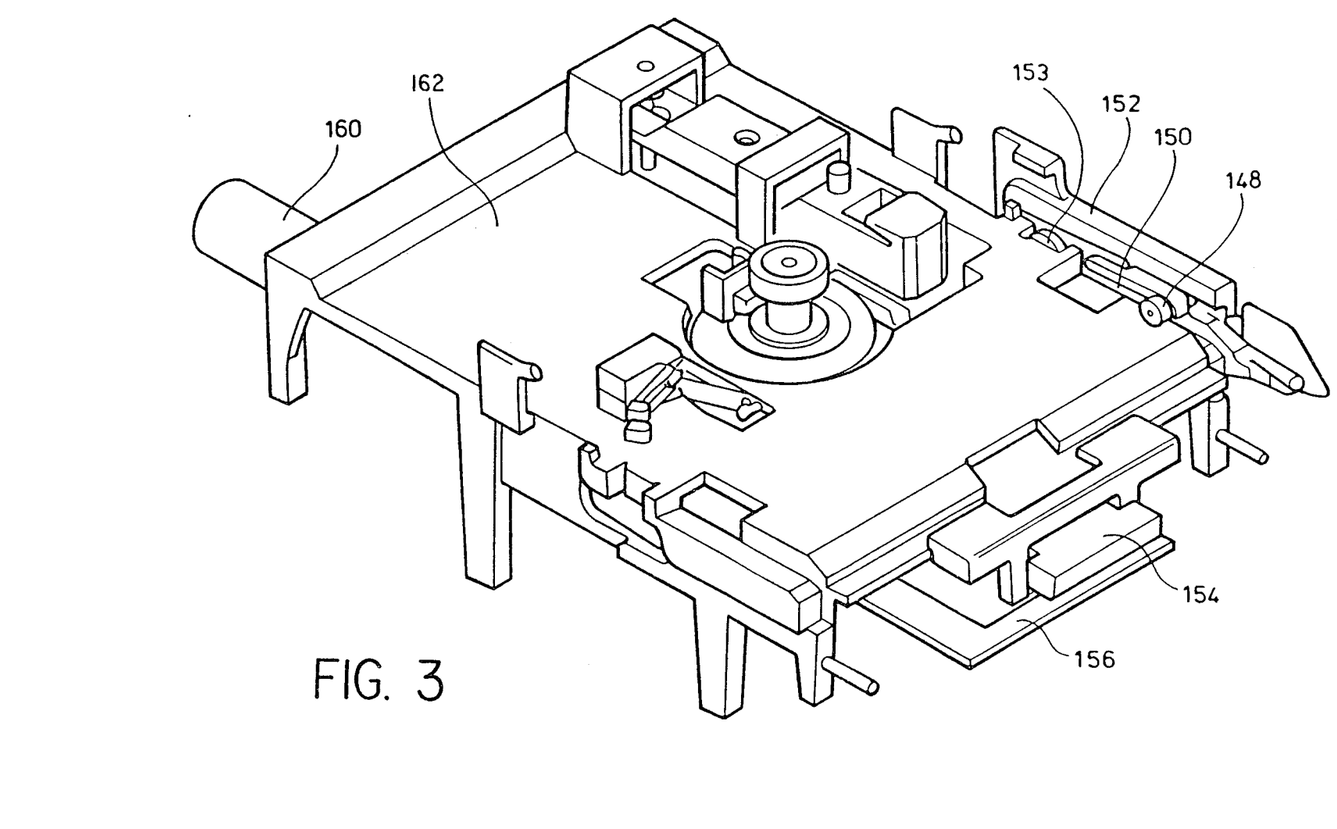
FIG. 3 is a perspective view of a cartridge drive unit adapted to be supplied automatically with cartridges of the type disclosed in U.S. Pat. No. 3,692,255.

The apparatus shown in FIGS. 1 and 2 is intended for use in feeding magnetic tape cartridges of the type disclosed in U.S. Pat. No. 3,692,255 between a cartridge storage cabinet and a loaded-tape position in a cartridge recording/playback unit (as illustrated, Hewlett-Packard's Model 9144 unit) of a disc/tape drive wherein the cartridge tape drive is used for backup purposes and user I/O. The type of tape cartridge is illustrated in FIG. 4 while the recording/playback unit is illustrated in FIG. 3, and will be referred to in greater detail below.

The apparatus comprises a rectangular base 10, having three spaced annular bearings 14, 16 and 18 secured thereto. Mounted vertically in these bearings are three rotatable pillars 22, 24, 26 which are screw-threaded along their lengths. Each pillar has rigidly secured thereon a pulley wheel 28 adjacent the respective bearing and around the three pulleys, and a fourth pulley wheel 28 mounted on the output shaft 20 of a motor 12, extends a tensioned drive belt 30. Each pulley has a serrated surface mating with corresponding teeth on the drive belt.

The three rotatable pillars are secured at their upper ends in spaced, parallel, vertical alignment by respective annular bearings 32, 34, 36 secured in a cover plate 38 described in detail below.

Secured by threaded bearings 40 to the three pillars 22, 24, 26 is a cartridge carrier in the form of a substantially T-shaped metal platform 42 having an elongate portion 44 and a deck portion 46 integrally-formed therewith. The platform 42 is entrained in a horizontal attitude by the bearings so as to be vertically movable when the three pillars are rotated in unison. The deck portion 46 has secured thereon in spaced parallel relationship two L-sectioned slide elements 48 and 50 having slide surfaces 52, 54 (and walls 53, 55) which are spaced apart by a distance slightly greater than the width of a cartridge. The slide elements are made of nylon but can also be formed of any hard, durable plastics material or of metal coated with plastics material, to provide a smooth sliding surface.

Mounted in bearings 56, 58, secured on and extending lengthwise of the elongate portion 44 of the platform 42 is a threaded shaft 60 coupled by a universal coupling 62 to an electric motor 64 which is mounted on a bracket 66 in coaxial alignment with the shaft 60. A threaded bush 68 is mounted on the shaft 60 for travel lengthwise of the shaft 60 as the shaft is rotated by the motor 64. The bush 68 has fastened thereto a metal plate 70 shown in greater detail in FIGS. 6 to 8. The plate 70 is secured to the bush 68 by screws (not shown) and comprises a first planar portion 72 which extends horizontally over the wall 55 of the slide element 50, an intermediate vertical portion 74 integrally formed with the first planar portion and spaced from the wall portion and the slide surface 54, and a planar arm portion 76 which extends horizontally, diagonally across the half of the deck portion 46 nearer the elongate portion 44. The arm portion is spaced above the deck portion by an amount which is slightly greater than the thickness of a tape cartridge for the purpose of moving the arm above the cartridge during the operation of the apparatus. The arm portion 76 includes an integrally-formed flange 78 (see FIG. 7) extending downwardly from the plane of the arm portion 76 such that it is clear of the deck portion 46 of the platform 42 and can abut an edge of a tape cartridge for the purpose hereinafter described.

Figure 6:
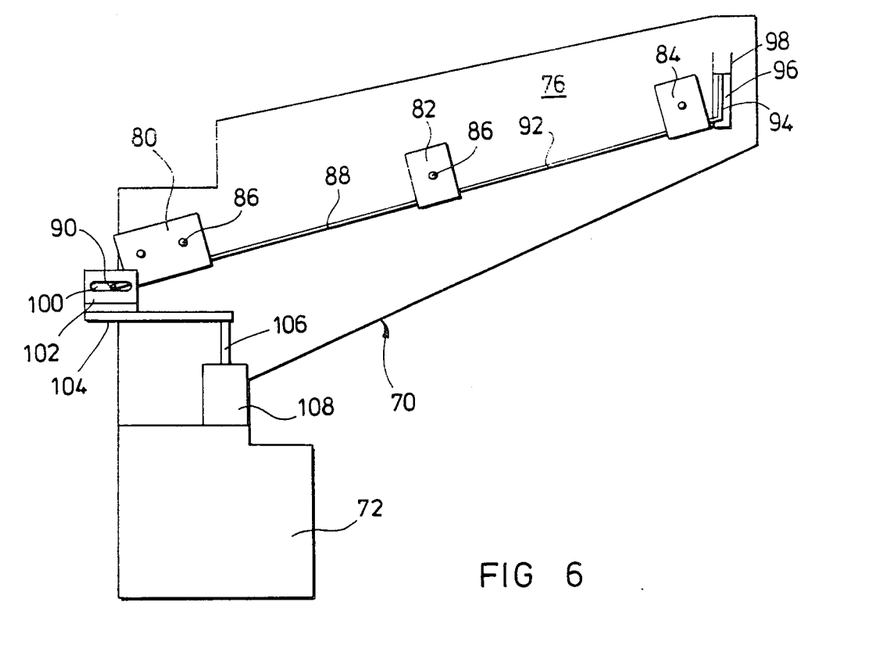
FIGS. 6 to 8 are plan, side and front views of parts of the apparatus shown in FIGS. 1 and 2.
Figure 7:
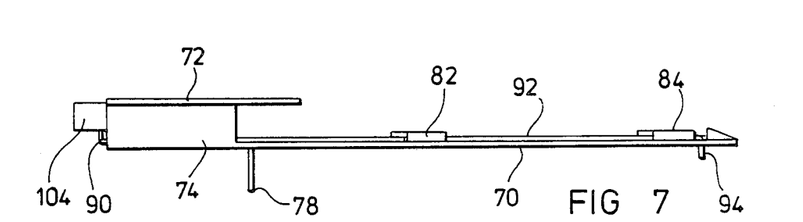
Figure 8:
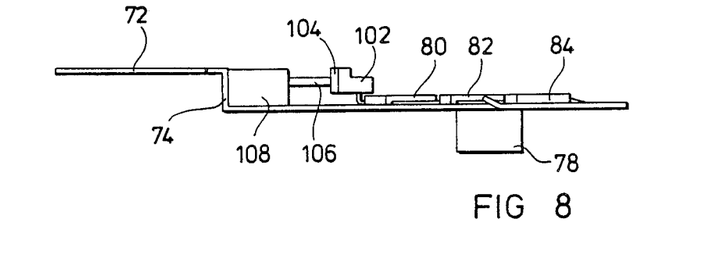
Figure 9:
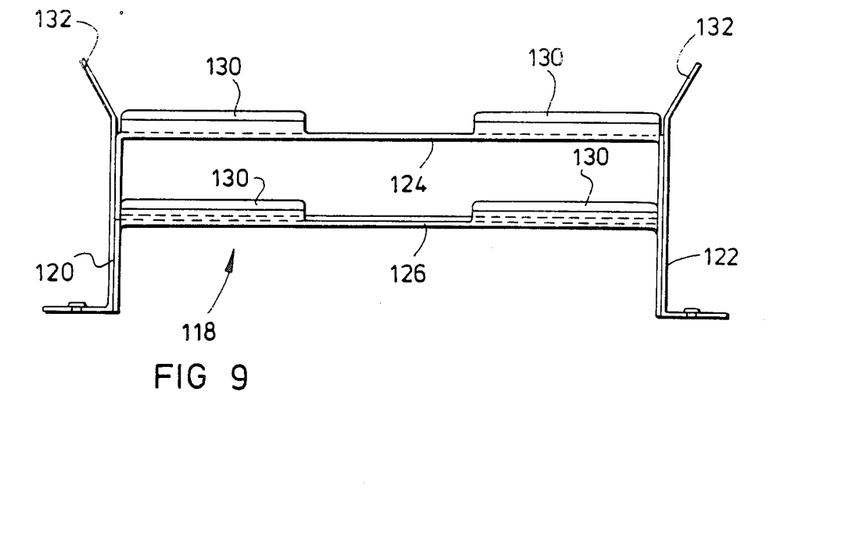
FIGS. 9 and 10 are front and side views of a base unit for the cabinet illustrated in FIG. 5.
Figure 10:
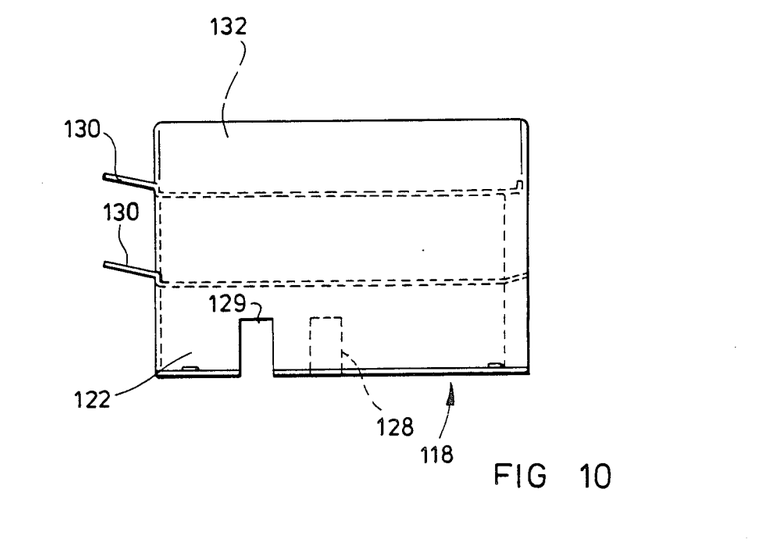

Mounted on the upper face of the arm portion 76, are three flat clips 80, 82 and 84, each of which has a channel or slot (not shown) formed in its underface and which, when the clips are secured by screws 86 to the arm portion 76, is colinear with each of the channels or slots of the other clips.

Entrained within these channels is a lever 88 provided by a length of semi-rigid, highly resilient wire, such as 18 gauge (1.2 mm) piano wire. The wire is formed adjacent one end by bending an end portion 90 thereof at right angles to the straight portion 92 of the lever, the other end portion 94 of the lever also being bent so that it subtends an angle of between 102° and 105° with the straight portion 92.

The free end portion of the arm portion 76 is provided with a narrow rectangular slot 96 from one end of which a flange 98 projects upwardly proud of the upper face of the arm portion 76 by an amount which is no greater than the height of the clips 80, 82, 84 above the upper face.

When the lever 88 is mounted in position, it can be rotated about its own axis such that the end portion 94 thereof can be rotated between a position in which it depends from the plane of the arm portion 76 and a position in which it abuts the flange 98 while lying substantially in the plane of the arm portion.

The opposite end portion 90 of the lever 88 is engaged in a slot 100 of a guide member 102 which is secured by screws (not shown) to an arm 104 mounted on the projecting core 106 of a solenoid 108 which is mounted on the arm portion 76. The construction and arrangement is such that when the solenoid 108 is energized, the core 106 is moved outwardly of the solenoid coil, thereby pushing the guide member to cause the end portion 90 of the lever 88, and thus the lever itself together with the end portion 94 thereof, to rotate about the axis of the lever. Thus the end portion 94 swings down into its dependent position.

The cover plate 38 comprises vertical side walls 110, 112, the wall 110 having a cut-out portion 114 to accommodate the reach of the belt 30 extending between the pulley wheel on the pillar 22 and the pulley wheel coupled to the drive motor. The side wall 112 has a base length which is greater than that of the wall 110, and a roof section 114 of the cover plate 38, integrally formed with the side walls 110, 112, is substantially L-shaped so as to cover the deck portion 46 and to provide bearing mounts for the pillars 22, 24 and 26.

Figure 5:
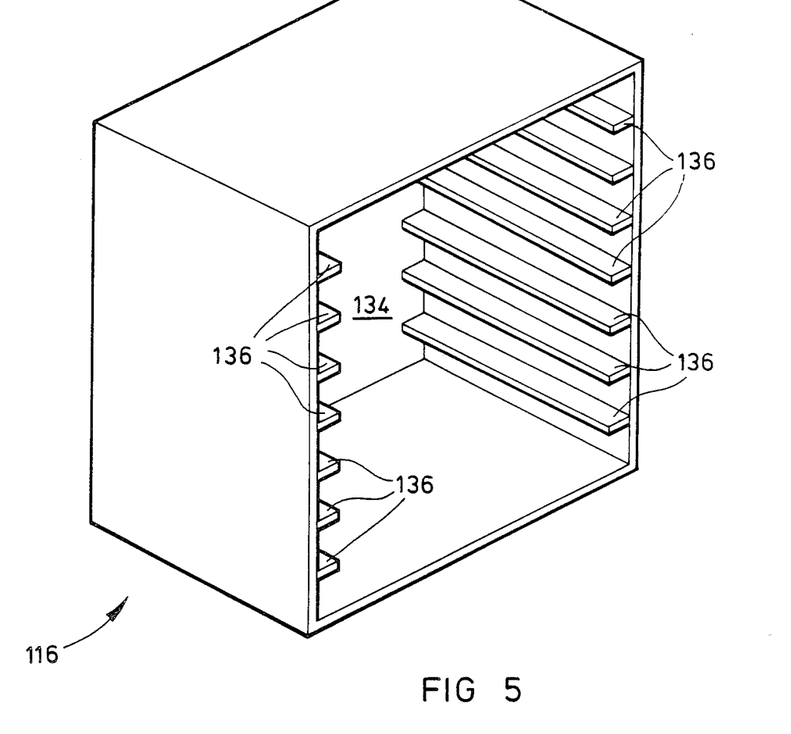
FIG. 5 is a perspective view of a cabinet for storing a stock of cartridges.

Adjacent the deck portion 46 of the platform 42 is provided a removable cartridge storage cabinet 116 shown in more detail in FIG. 5. The cabinet 116 stands upon its own base unit 118 which is secured by screws to the base 10. The base unit includes side walls 120, 122 and two shelf units 124, 126, the shelf unit 124 providing a floor for supporting the cabinet 116. The side wall 120 has an aperture 128 formed therein, and the opposite side wall is provided with a similar aperture 129 to provide for movement of the drive belt 30 therethrough. Each of the two shelf units 124, 126 is provided with a cut-out to allow manual access to the underside of what is placed on that shelf. The shelf 126 provides storage for a cleaning unit for cleaning the recording/playback head of the recording/playback unit described below. To facilitate accurate location of the cleaning unit, the shelf 126 is provided with rearwardly extending, upwardly inclined flanges 130 allowing the unit to slide into position on the shelf 126. The space between the two shelves 124, 126 is of a height such as to accommodate the cleaning unit and to allow the arm portion 76 of the plate 70 to move freely between the top of the cleaning unit and the underside of the shelf 124, as hereinafter described.

The side walls 120, 122 have outwardly and upwardly diverging flange portions 132 which with the flanges 130 allow a cabinet 116 to be placed accurately thereon.

Figures 4A, 4B:
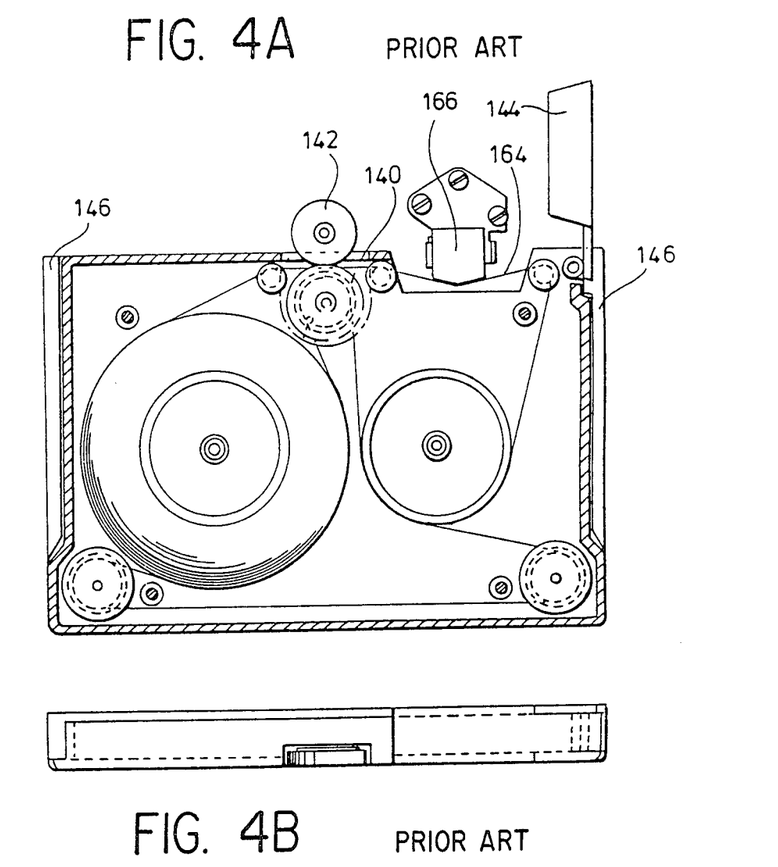
FIGS. 4A and 4B are plan and side views of the aforesaid cartridge.

The cabinet 116 (FIG. 5) provides storage for eight magnetic tape cartridges of the type previously referred to and shown in FIGS. 4A and 4B, and comprises a box having an open front and a half-width rear wall 134, and seven sets of spaced runners 136, each set being spaced heightwise from the floor such that eight compartments are defined within the cabinet, the seven uppermost compartments being open bottomed. The spacing is such that a magnetic tape cartridge can rest on each set of runners with one cartridge on the bottom of the cabinet, totalling eight in all. Between adjacent cartridges a gap is provided for, which is of sufficient height to allow the arm portion 76 to move between the cartridges.

As explained briefly above, the preferred embodiment of the invention is intended for use in selecting any one of the cartridges stored in the cabinet 116, or the cleaning unit stored on the shelf 126 of the base unit 118 and delivering the cartridge (or cleaning unit) to the recording/playback unit, specifically the unit illustrated in FIG. 3.

Each cartridge, as shown in FIG. 4A, has a driving roller 140 arranged to be urged against a drive roller 142 of the recording/playback unit and a region where the recording head is urged against the magnetic tape as the tape is fed past the head, the tape being normally protected by a door 144 which is automatically opened as the cartridge is fed into the unit to expose the tape to the head. Full details of the structure of this type of cartridge are to be found in the specification of U.S. Pat. No. 3,692,255. A commercial version of this type of cartridge is Hewlett Packard Company's 9164-0127 cartridge, which cartridge has a metal base having side flanges 146 which project laterally of the side walls of the cartridge and are arranged to be engaged by bearing wheels 148 located on spring loaded arms 150 mounted on side plates 152 (only one of which is shown in FIG. 3) of the playback/recording unit. The purpose of these spring-loaded arms is to accurately locate the cartridge as it is presented in the unit. Rollers 153 bear against the undersides of the side flanges of the cartridge to hold the cartridge firmly in position. As a cartridge is inserted it controls operation of micro switches in electrical circuitry associated with the tape unit but which are not directly related to the invention described herein. When it is desired in such a tape unit to release a cartridge this is normally achieved manually by depressing a stop member 154 which is mechanically connected to the two rollers 153. The preferred apparatus according to the invention provides for release of a cartridge to be under the control of a solenoid-operated lever assembly 156 coupled to the stop member and to the plunger of a solenoid 160 mounted on the rear of the chassis of the tape unit.

The platform drive motor 12, the plate drive motor 64, the solenoid 108 and solenoid-operated lever assembly 156 are controlled by a central control unit (not shown) to cause the apparatus to operate in a manner to be described below. The control unit receives inputs indicative of the state of the mechanisms of the apparatus from sensors arranged to sense the position of the lift platform 42 and of the deck plate 70. In addition, the control unit also receives external commands as to which cartridge to select and as to when a recording/playback operation has been completed and a cartridge can be removed from the tape unit. Suitable implementations of the control unit (for example, as a microprocessor controller) will be apparent to persons skilled in the art; accordingly, a detailed description of the control unit will not be given herein. However, a preferred form of position sensor for the plate 70 will be briefly described with reference to FIG. 11.

Figure 11:
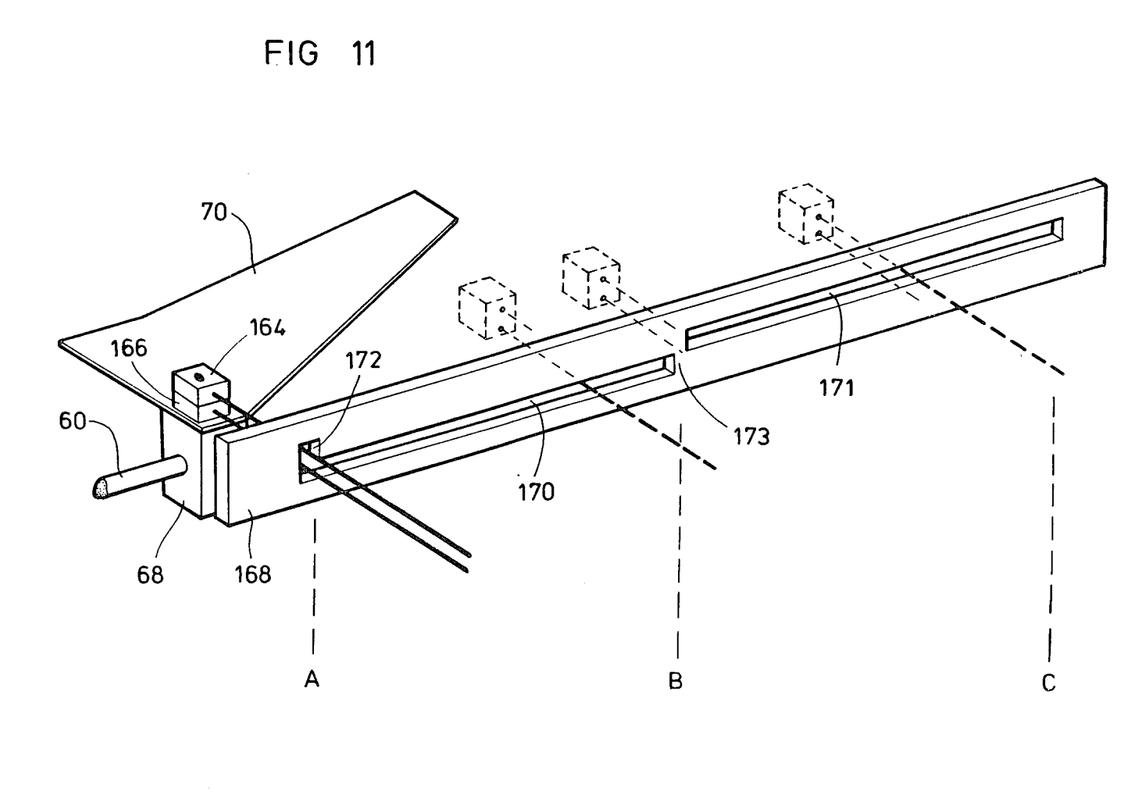
FIG. 11 is a perspective view of a position sensor used in the apparatus.

The position sensor shown in FIG. 11 comprises an apertured reflective bar 168 fixed to the elongate portion 44 of the platform 42 alongside the threaded shaft 60, and first and second infrared emitter/detector units 164, 166 mounted vertically one above the other on the threaded bush 68 attached to the plate 70. Each unit 164, 166 is arranged to emit a parallel horizontal beam of infrared radiation which is reflected back to the unit from the bar 168 except when an aperture in the latter is located opposite the unit. The detector portion of each unit 164, 166 is operative to detect the presence or absence of a reflected beam, each unit being provided with two-state output circuitry whereby the two units together have four possible output state combinations with the identity of the current output combination being dependent on the aperturing of the bar 168 directly opposite the units 164, 166.

More particularly, the bar 168 is apertured such that two of the four possible output combinations of the units 164, 166 represent respective point locations A and B while the other two output combinations represent respective ranges of locations. Thus, a first elongate slot 170 formed in the bar 168 extends from adjacent one end of the bar to approximately halfway along the bar. This slot 170 is located at the level of the emitter/detector unit 166. A second elongate slot 171 extends approximately from the half-way location towards the other end of the bar 168. The slot 171 is located at the level of the emitter/detector unit 166. Adjacent the one end of the bar 168, the slot 170 is extended upwards, as indicated at 172, so that only at this position is radiation from both units 164, 166 transmitted through the bar. The slots 170,171 terminate short of each other in the halfway region 173 of the bar 168 whereby at this position radiation from both units 164, 166 is reflected back by the bar.

If the reflection of radiation and its detection produces a binary '1' output from the associated unit 164, 166 whilst the non-reflection (and so non-detection) of radiation produces a binary '0', then the variation in the output states of the unit as the block 68 and plate 70 are moved along the shaft 60, is as follows:

|  | A | A<—>B | B | B<—>C |
|---|---|---|---|---|
| Unit 164 | 0 | 1 | 1 | 0 |
| Unit 166 | 0 | 0 | 1 | 1 |

In relation to the present apparatus, position A corresponds to the position at which a cartridge entrained by the plate 70 is located at the recording/playback unit, position B corresponds to the position at which the cartridge is positioned on the elevator platform 42, and position C corresponds to the position at which the arm portion 70 engages a cartridge in the latter's allocated position in a stack of cartridges; A←—→B and B←—→C indicate the positions of the arm portion 70 as it is moved between positions A and B and positions B and C.

A separate infrared emitter/detector unit (not shown) is provided to detect when the block 68 is located at position C, the block 68 being provided with a suitable reflecting area for reflecting radiation back to the unit when positioned juxtaposed the latter. The output of this unit is fed, together with the outputs of the units 164, 166, to the control unit to provide the required position information on the plate 70.

A similar position sensor to that described with reference to FIG. 11 may be used for sensing the vertical position of the platform 42.

The overall operation of the apparatus will now be described.

When it is desired to load a cartridge from the cabinet into the tape unit, the control unit commands the motor 12 to drive the belt 30 to rotate the pillars 14, 16, 18 to move the platform up or down from its previous position to a position in which the slide surfaces 52, 54 of the slide elements 48, 50 mounted on the deck portion 46 are coplanar with the runners 136 on which the selected cartridge is housed. The motor 64 is then energized by the control unit to drive the shaft 60 to move the plate 70 from a position in which the arm portion 76 overlies the deck portion 46 of the platform 42 to a position in which the arm portion 76 overlies the selected cartridge with the slot 96 to the rear of the cartridge. In this position, the solenoid 108 is activated by the control unit to move the guide member 102 to rotate the lever 88 and thereby engage the end portion 94 of the lever behind the rear edge of the cartridge. The motor 64 is then operated in the reverse direction to withdraw the arm portion 76 from the cabinet 116, drawing the selected cartridge with it until the cartridge is located on the slide surfaces 52, 54 of the slide elements 48, 50 respectively.

The motor 64 is then stopped and the drive belt motor energized to raise/lower the platform 42 to a level at which the slide surfaces 52, 54 are horizontally coplanar with the deck 162 of the record and playback unit. The solenoid 160 is then actuated to cause the stop member 154 to be depressed to lower the rollers 153 and thus allow the cartridge unimpeded entry to the deck. The motor 64 is again operated by the control unit to move the plate 70 over the deck and draw the cartridge onto the deck 162 until the roller 140 is urged firmly against the drive roller 142 of the unit and the door 144 of the cartridge has been opened, as shown in FIG. 4A, to expose the tape 164 which is then urged against the recording/playback transducer head 166 of the unit. On moving across the deck 162, the cartridge, once in situ, is held by the spring force of the rollers 153.

When it is desired to return the cartridge back to its location in the cabinet 116, the motor 64 is reversed, and the flange 78 urges against the cartridge as the arm portion 76 of the plate 70 is moved in the reverse direction to the previous direction of movement. Prior to reversal of the motor 64, the solenoid 160 is operated to depress the stop member 154 through the lever assembly 156 to release the cartridge from the grip of the rollers 153.

The cartridge is then returned to its location in the cabinet 116 by simple reversal of the above described process, whereafter another cartridge can then be selected. The control unit may control the illustrated apparatus to deliver cartridges sequentially or to deliver them in any desired order.

Figure 12:
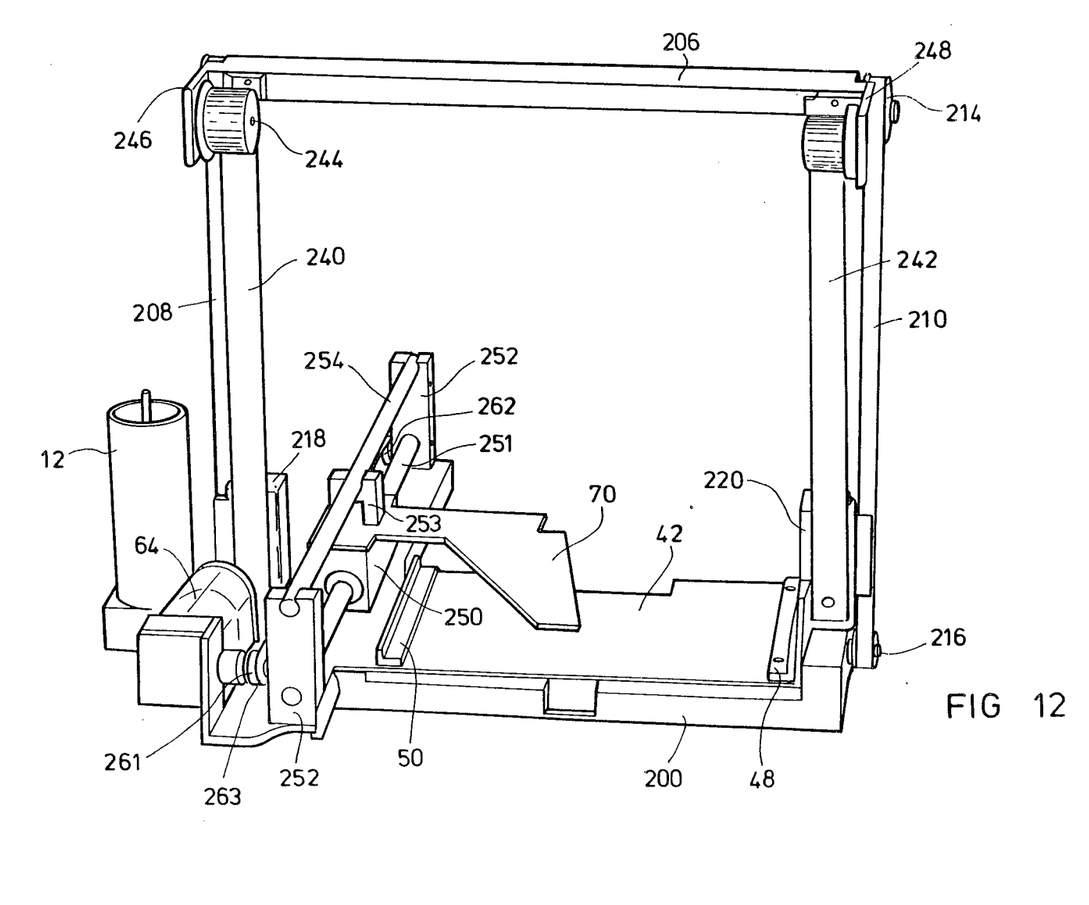
FIGS. 12 and 13 are perspective views of a variant of the main displacement mechanisms illustrated in FIGS. 1 and 2.
Figure 13:
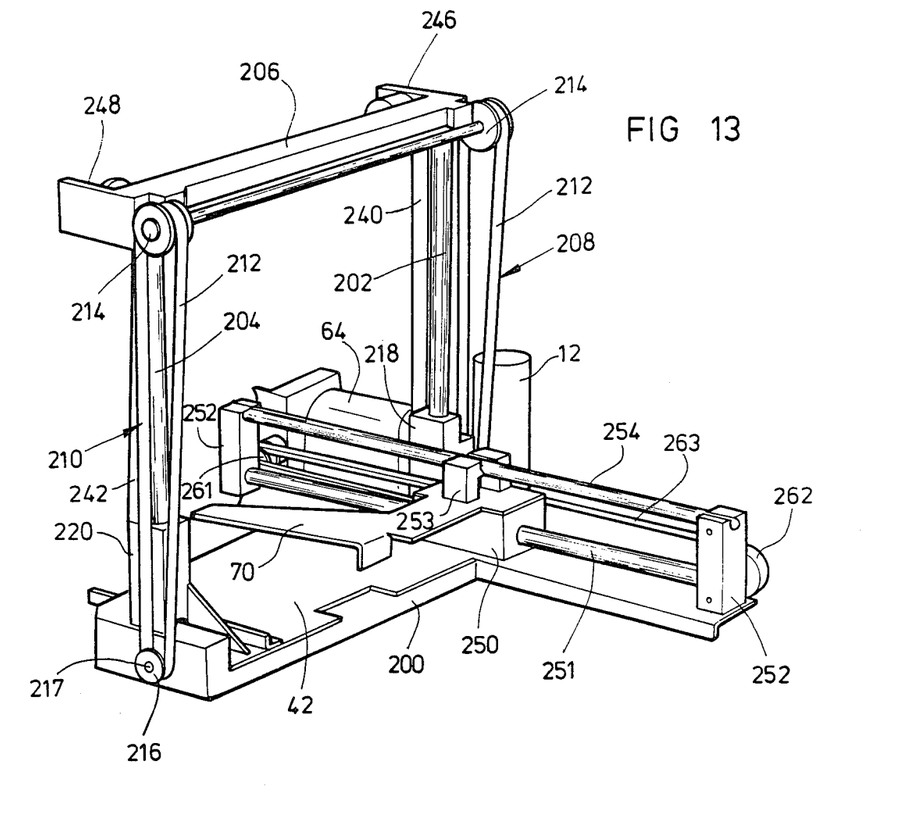

In FIGS. 12 and 13, there is shown in fragmentary form, an alternative, preferred version of the main movement mechanisms of the apparatus in which the screw drives shown in FIGS. 1 and 2 are replaced by belt drives.

In the version of the apparatus illustrated in FIGS. 12 and 13 a substantially rectangular base 200 supports two vertical pillars 202, 204 which are secured at their upper extremities by a bridge portion 206. Extending vertically, adjacent each pillar and outside the bridge formed thereby with the bridge portion 206 is a belt-and-pulley arrangement 208, 210 respectively, each provided by a tensioned toothed endless belt 212 extending around two rotatable pulleys 214, 216. The lower pulleys 216 are mounted on a common shaft 217 which is arranged to be driven by an electric motor 12.

Mounted for vertical sliding movement on the pillar 202 is a block 218, and a like block 220 is mounted on the pillar 204. Flange portions of the blocks are pinned to corresponding reaches of the endless belts 210, 212 in a manner such that the two blocks can be raised and lowered together.

The two blocks 218, 220 are rigidly fastened to a platform 42 which is similar in form to that described above with reference to FIGS. 1 and 2, and serves to support a tape cartridge, of the type hereinbefore referred to, on slide elements 48,50.

The weight of the platform 42 and the components of the apparatus provided thereon, is counteracted by two coiled springs 240,242 which are mounted on spindles 244 on bracket members 246, 248 secured to opposite ends of the bridge portion 206. The springs 240,242 when extended, lie parallel to the two pillars 202, 204 and are secured to the blocks 218, 220. The construction and arrangement is such that the counteracted weight of the platform 42 can be easily raised and lowered by the belt-and-pulley arrangements 208,210 without placing undue tension on the belts 212 thereof.

The mechanism for moving the plate 70 in the variant of FIGS. 12 and 13 comprises a slide block 250 arranged to slide along a smooth shaft 251 which is mounted between two supports 252 fixed to the platform 42. The block 250 is constrained against rotation by engagement of members 253 with a bar 254 which also extends between the supports 252. The plate 70 is rigid with the block 250; in the illustrated variant, the plate 70 is similar to that of FIGS. 1 and 2 but with the vertical portion omitted.

Movement of the block 250 is effected by means of a belt-and-pulley arrangement. This arrangement comprises a respective pulley 261,262 rotatably mounted on the side of each support 252, and a toothed endless-belt 263 which extends around the pulleys and has its upper pass pinned to one side of the block 250. The pulley 261 is arranged to be rotated by the electric motor 64.

For reasons of clarity, the position sensors for monitoring movement of the platform 42 and plate 70 have been omitted from FIGS. 12 and 13; similarly, the lever 88 and its operating solenoid have also not been shown.

Operation of the variant illustrated in FIGS. 12 and 13 is substantially the same as operation of the apparatus of FIGS. 1 and 2.

We claim:

1. A cartridge handling apparatus for selectively and sequentially transferring a plurality of tape cartridges from a storage cabinet (116) holding the stored cartridges in a substantially vertical stack, to a tape cartridge record/playback unit, in a generally horizontal attitude, for improving the handling of rapid transfer of generally high density data, to and from the cartridge, the cartridge handling apparatus comprising:
   a. base means (10) for supporting the apparatus on a generally horizontal surface;
   b. cartridge displacement means (42, 70) for transferring the selected tape cartridges in a desired sequence, between the storage cabinet and the record/playback unit in a generally horizontal direction, substantially parallel to said base means;
   c. said cartridge displacement means being disposed intermediate the storage cabinet and the record/playback unit;
   d. wherein the storage cabinet and the record/playback unit are disposed on different sides of said cartridge displacement means, for reducing the overall height of the arrangement comprising the storage cabinet, the record/playback unit and said cartridge displacement means, in order to permit the use thereof in relatively small and compact locations;
   e. support means (22, 24 and 26), mounted on said base means, at a generally predetermined distance thereabove, for causing said cartridge displacement means to be generally moved in the vertical direction, above said base means;
   f. said cartridge displacement means including vertically displaceable platform means (42) for delivering the selected tape cartridges to the record/playback unit;
   g. said platform means being adjustably mounted, and vertically positionable on said support means;
   h. said cartridge displacement means further including plate means for selectively drawing (70) the tape cartridges from the storage cabinet, for transfer to said platform means prior to delivery to the record/playback unit; and
   i. said plate means being positionably secured to said platform means, at a generally predetermined distance thereabove.

2. A cartridge handling apparatus as defined in claim 1, wherein said base means has a generally flat and substantially rectangular configuration.

3. A cartridge handling apparatus as defined in claim 1, wherein said platform means is entrained in a generally horizontal attitude by said support means, so as to be vertically movable thereby.

4. A cartridge handling apparatus as defined in claim 1, wherein said platform means includes an elongated portion (44), for engaging said support means and said plate means.

5. A cartridge handling apparatus as defined in claim 4, wherein said platform means is generally T-shaped.

6. A cartridge handling apparatus as defined in claim 5, wherein said platform means further includes a deck portion (46) which is integrally formed with said elongated portion (44).

7. A cartridge handling apparatus as defined in claim 6, wherein said cartridge displacement means further includes two spaced-apart slide elements (48, 50) which are secured on said deck portion (46), in opposite relationship relative to one another.

8. A cartridge handling apparatus as defined in claim 7, wherein said slide elements (48, 50) are spaced-apart by a distance which is slightly greater than the width of a single tape cartridge.

9. A cartridge handling apparatus as defined in claim 8, wherein each one of said slide elements is generally L-shaped.

10. A cartridge handling apparatus as defined in claim 9, wherein said slide elements have a suitable thermoplastic composition for providing smooth sliding surfaces.

11. A cartridge handling apparatus as defined in claim 10, wherein said slide elements are made of nylon, and wherein said platform means has a metallic composition.

12. A cartridge handling apparatus as defined in claim 9, wherein said slide elements have a metallic composition, and are coated with suitable thermoplastic material.

13. A cartridge handling apparatus as defined in claim 8, further including attachment means for securing adjustably said plate means to said elongated portion (44) of said platform means (42).

14. A cartridge handling apparatus as defined in claim 13, wherein said attachment means includes:
   a. a plurality of spaced-apart bearing means (56, 58) secured to the elongated portion (44);
   b. an elongated threaded shaft (60), extending between, and secured rotatably to said bearing means (56, 58); and
   c. bush means (68) mounted on said shaft (60), for travelling along the axial length of said shaft, intermediate said bearing means, as said shaft is rotated about its axis.

15. A cartridge handling apparatus as defined in claim 14, wherein said cartridge displacement means further includes motor means (64) for rotating said shaft (60) about its axis.

16. A cartridge handling apparatus as defined in claim 15, further including control means for synchronizing the operation of said cartridge displacement means, said lever means (88), and said motor means (64).

17. A cartridge handling apparatus as defined in claim 16, wherein said control means includes sensing means (164, 166, 168) for supplying signals indicative of the relative position of said platform means (42).

18. A cartridge handling apparatus as defined in claim 17, wherein said sensing means includes an elongated apertured reflective bar (168) secured to said elongated portion (44), in a generally parallel relationship relative to said shaft (60).

19. A cartridge handling apparatus as defined in claim 18, wherein said sensing means further includes at least one detector unit (164) for detecting the presence or absence of the apertured bar (168).

20. A cartridge handling apparatus as defined in claim 19, wherein said reflective bar (168) includes at least one aperture (170), and wherein said detector unit (164) is arranged to a signal indicative of the presence or absence of the aperture (170).

21. A cartridge handling apparatus as defined in claim 13, wherein a first one of said slide elements (50) is disposed adjacent said elongated portion (44), and is generally parallel thereto.

22. A cartridge handling apparatus as defined in claim 21, wherein said plate means (70) includes a first substantially planar portion (72) which extends partially over said first slide element (50), in a generally horizontal disposition.

23. A cartridge handling apparatus as defined in claim 22, wherein said plate means further includes a second substantially planar portion (74) which is formed integrally with said first portion (72), and which depends downwardly therefrom at about a right angle.

24. A cartridge handling apparatus as defined in claim 23, wherein said second portion (74) is spaced from said first slide element (50).

25. A cartridge handling apparatus as defined in claim 24, wherein said plate means (70) further includes an arm portion (76), which is connected to said second portion (74) in a genrerally horizontal attitude, and wherein said arm portion (76) extends partially across said deck portion (46).

26. A cartridge handling apparatus as defined in claim 25, further including a base unit (118) for supporting the storage cabinet (116), and for elevating it above said base means (10).

27. A cartridge handling apparatus as defined in claim 26, wherein said base unit (116) further includes a pair of upright and oppositely disposed side walls (120, 122).

28. A cartridge handling apparatus as defined in claim 27, wherein said base unit further includes a pair of spaced-apart shelf units (124, 126), which are generally disposed in the horizontal attitude, one above the other intermediate said pair of side walls (120, 122), and wherein the upper shelf unit (124) supports the storage cabinet (116).

29. A cartridge handling apparatus as defined in claim 28, wherein each one of said shelf units (124, 126) includes a cut-out portion, for providing a manual access-way to the content of said shelf units.

30. A cartridge handling apparatus as defined in claim 29, wherein at least one of said shelf units includes an outwardly extending flange (130), for facilitating the access to, as well as the positioning of articles on said shelf units.

31. A cartridge handling apparatus as defined in claim 30, wherein said shelf units (120, 122) define a clearance space therebetween, and wherein said clearance space is of sufficient height to enable said arm portion (76) to move freely between said shelf units.

32. A cartridge handling apparatus as defined in claim 31, wherein at least one of said side walls (120, 122) includes an upwardly and outwardly diverging flange portion (132), for enabling the accurate positioning of the storage cabinet (116) atop said base unit (118).

33. A cartridge handling apparatus as defined in claim 26, wherein the storage cabinet (116) provides storage for a plurality of tape cartridges in a generally stacked, spaced-apart relationship and horizontal attitude.

34. A cartridge handling apparatus as defined in claim 33, wherein the storage cabinet includes a plurality of spaced-apart runners, for defining a plurality of adjacent compartments to receive the tape cartridges.

35. A cartridge handling apparatus as defined in claim 34, wherein each one of said compartments are of sufficient height to enable said arm portion (76) to move freely therein, at a relatively short distance above the selected tape cartridge stored in the compartment.

36. A cartridge handling apparatus as defined in claim 35, wherein the tape cartridges are of the type sold by Hewlett-Packard Company under part No. 9164-0127.

37. A cartridge handling apparatus as defined in claim 25, wherein said arm portion (76) depends integrally from said second portion (74), and extends diagonally across said deck portion (46).

38. A cartridge handling apparatus as defined in claim 24, wherein said arm portion (76) is spaced above said deck portion (46) by a distance which is slightly greater than the thickness of a selected tape cartridge, for enabling said arm portion (76) to move freely above said deck portion during the transfer of the tape cartridge to and from the storage cabinet.

39. A cartridge handling apparatus as defined in claim 38, wherein said plate means further includes a flange (78) which depends downwardly, in a substantially vertical attitude, from said arm portion (76).

40. A cartridge handling apparatus as defined in claim 39, wherein said flange (78) is spaced from said deck portion (46), in order to enable the free displacement of said arm portion (76) above said deck portion (46).

41. A cartridge handling apparatus as defined in claim 40, wherein said flange (78) is of sufficient length to abut an edge of the selected tape cartridge.

42. A cartridge handling apparatus as defined in claim 41, wherein said arm portion (76) includes an upper face, a first free end, and an oppositely disposed second end, wherein said second end is positioned adjacent to said first planar surface (72), and wherein said cartridge displacement means further includes lever means (88) which is secured rotatably to said upper face of said arm portion (76), and which extends along the length of said arm portion, intermediate said pair of opposed ends.

43. A cartridge handling apparatus as defined in claim 42, wherein said lever means (88) includes a length of wire having a generally flexible and resilient composition, and wherein said length of wire includes two opposed free end portions (94, 90).

44. A cartridge handling apparatus as defined in claim 43, wherein said length of wire has a size of about 18 gauge (1.2 mm).

45. A cartridge handling apparatus as defined in claim 44, wherein said first free end of said arm portion includes an opening (96), for receiving pivotally a first one of said free end portions (94) of said wire.

46. A cartridge handling apparatus as defined in claim 45, wherein said opening (96) is substantially rectangular in shape.

47. A cartridge handling apparatus as defined in claim 45, wherein said wire includes a substantially straight portion (92), and wherein the second end portion (90) is bent at about a right angle relative to said straight portion (92).

48. A cartridge handling apparatus as defined in claim 47, wherein said second end portion (94) is bent relative to said straight portion (92) at an angle which varies generally between 102 degrees and 105 degrees.

49. A cartridge handling apparatus as defined in claim 47, wherein said lever means (88) further includes a solenoid arrangement (108) mounted on said arm portion (76), for causing said length of wire to be rotated relative to said arm portion (76), in order to force said first end portion (94) thereof into engagement with the selected cartridge.

50. A cartridge handling apparatus as defined in claim 49, wherein said lever means (88) further includes a guide member (102) having an elongated slot (100) for receiving the second end portion (90), and for guiding its movement during the activation of said solenoid arrangement (108).

51. A cartridge handling apparatus as defined in claim 43, wherein said lever means further includes means for securing rotatably said length of wire to said upper face of said arm portion (76).

52. A cartridge handling apparatus as defined in claim 1, wherein said support means includes a plurality of rotatable upright spaced-apart pillars (22, 24, 26) which are mounted on said base means (10), for enabling the generally vertical movement of said cartridge displacement means (42, 70).

53. A cartridge handling apparatus as defined in claim 52, further including cover means (38) which is attached to said support means, above said base means (10).

54. A cartridge handling apparatus as defined in claim 52, wherein said support means further includes a pulley-belt arrangement (12, 28, 30) for causing said pillars to be rotated in unison.

55. A cartridge handling apparatus as defined in claim 1, wherein said cartridge displacement means includes two generally similar spaced-apart upright pillars (202, 204) and a bridge portion (206), wherein said pillars are oppositely disposed relative to said platform means (42), wherein each one of said pillars has one lower end and one upper end, wherein said lower ends of said pillars are connected to said pltform means (42), and wherein said upper ends are connected to said bridge portion (206).

56. A cartridge handling apparatus as defined in claim 55, wherein said cartridge displacement means further includes at least one pulley-and-belt arrangement (208) disposed adjacent to one of said pillars (202) and connected rotatably to said platform means and to said bridge portion (206).

57. A cartridge handling apparatus as defined in claim 56, wherein said cartridge displacement means includes another generally similar pulley-and-belt arrangement (210), which is disposed adjacent to the other pillar (204), and which is connected to said platform means and to said bridge portion (206).

58. A cartridge handling apparatus as defined in claim 57, wherein said cartridge displacement means further includes two coiled springs (240, 242), each one of which is disposed adjacent to a corresponding one of said pillars, and is connected to said bridge portion and to said platform means, for counteracting the weight of the cartridge handling apparatus.

59. A tape-cartridge record/playback apparatus having a cartridge handling apparatus for selectively and sequentially transferring a plurality of tape cartridges from a storage cabinet (116) holding the stored cartridges in a substantially vertical stack, to the tape cartridge record/playback unit, in a generally horizontal attitude, for improving the handling of rapid transfer of generally high density data, to and from the cartridge, the cartridge handling apparatus comprising:
  a. base means (10) for supporting the apparatus on a generally horizontal surface;
  b. cartridge displacement means (42, 70) for transferring the selected tape cartridges in a desired sequence, between the storage cabinet and the record/playback unit in a generally horizontal direction, substantially parallel to said base means;
  c. said cartridge displacement means being disposed intermediate the storage cabinet and the record/playback unit;
  d. wherein the storage cabinet and the record/playbck unit are disposed on different sides of said cartridge displacement means, for reducing the overall height of the arrangement comprising the storage cabinet, the record/playback unit and said cartridge displacement means, in order to permit the use thereof in relatively small and compact locations;
  e. support means (22, 24 and 26), mounted on said base means, at a generally predetermined distance thereabove, for causing said cartridge displacement means to be generally moved in the vertical direction, above said base means;
  f. said cartridge displacement means including vertically displaceable platform means (42) for delivering the selected tape cartridges to the record/playback unit;
  g. said platform means being adjustably mounted, and vertically positionable on said support means;
  h. said cartridge displacement means further including plate means for selectively drawing (70) the tape cartridges from the storage cabinet, for transfer to said platform means prior to delivery to the record/playback unit; and
  i. said plate means being positionably secured to said platform means, at a generally predetermined distance thereabove.

60. A method for handling of rapid transfer of generally high density data to and from a tape cartridge, in a tape-cartridge record/playback apparatus having a cartridge handling apparatus, for selectively and sequentially transferring a plurality of tape cartridges from a storage cabinet (116) holding the stored cartridges in a substantially vertical stack, to the tape cartridge record/playback unit, in a generally horizontal attitude, the method for handling comprising the steps of:
  a. supporting the tape-cartridge record/playback apparatus on a generally horizontal surface;
  b. transferring the selected tape cartridges in a desired sequence, between the storage cabinet and the record/playback unit, in a generally horizontal direction, substantially parallel to the horizontal surface;

c. disposing a cartridge displacement means intermediate the storage cabinet and the record/playback unit;

d. disposing the storage cabinet and the record/playback unit on different sides of said cartridge displacement means, for reducing the overall height of the arrangement comprising the storage cabinet, the record/playback unit and said cartridge displacement means, in order to permit the use thereof in relatively small and compact locations;

e. causing said cartridge displacement means to be generally moved in the vertical direction, above horizontal surface;

f. delivering the selected tape cartridges to the record/playback unit; and g. selectively drawing the tape cartridges from the storage cabinet, prior to delivery to the record/playback unit.

* * * * *